(12) United States Patent
Nalluri et al.

(10) Patent No.: US 9,792,391 B2
(45) Date of Patent: Oct. 17, 2017

(54) REFINING OF MATERIAL DEFINITIONS FOR DESIGNED PARTS

(71) Applicant: Siemens Product Lifecycle Management Software Inc., Plano, TX (US)

(72) Inventors: Sivarama Nalluri, Mason, OH (US); Raymond Kok, East Windsor, NJ (US); Sunil Viswanathan, Cypress, CA (US)

(73) Assignee: SIEMENS PRODUCT LIFECYLE MANAGEMENT SOFTWARE INC., Planto, TX (US)

( * ) Notice: Subject to any disclaimer, the term of this patent is extended or adjusted under 35 U.S.C. 154(b) by 804 days.

(21) Appl. No.: 14/298,278

(22) Filed: Jun. 6, 2014

(65) Prior Publication Data
US 2015/0356205 A1   Dec. 10, 2015

(51) Int. Cl.
*G06F 17/50* (2006.01)
*G06Q 10/06* (2012.01)

(52) U.S. Cl.
CPC .......... *G06F 17/50* (2013.01); *G06F 17/5009* (2013.01); *G06Q 10/0637* (2013.01)

(58) Field of Classification Search
USPC .................. 703/1, 2; 700/109; 705/35, 348
See application file for complete search history.

(56) References Cited

U.S. PATENT DOCUMENTS

| | | | |
|---|---|---|---|
| 5,552,995 A | 9/1996 | Sebastian | |
| 6,220,743 B1 | 4/2001 | Campestre et al. | |
| 6,418,352 B1 | 7/2002 | Ellis et al. | |
| 6,477,438 B1 | 11/2002 | Sakai et al. | |
| 6,801,818 B2 | 10/2004 | Kopcha | |
| 7,103,434 B2 | 9/2006 | Chernyak et al. | |
| 7,209,846 B2 * | 4/2007 | Tamaki | G06Q 10/06 700/109 |
| 7,340,315 B2 | 3/2008 | Ozasa et al. | |
| 7,403,833 B2 | 7/2008 | Heide et al. | |

(Continued)

FOREIGN PATENT DOCUMENTS

| | | |
|---|---|---|
| CN | 1953463 B | 6/2010 |
| CN | 102004943 B | 10/2013 |

(Continued)

OTHER PUBLICATIONS

PCT Search Report dated Oct. 16, 2015, for PCT Application No. PCT/U52015/032357, 11 pages.

(Continued)

*Primary Examiner* — Thai Phan (57) ABSTRACT

Various disclosed embodiments include a method for assigning a refined material definition to a designed part, the method performed by a data processing system and including accessing the designed part through the data processing system. The method also includes assigning one or more nominal material definitions (NMDs) of one or more materials to the designed part. The method further includes selecting one or more functional material definition variations (FMDVs) associated with the assigned NMD for the designed part in order to generate a refined material definition (RMD) for the designed part. The method includes generating the refined material definition (RMD) based on the NMD and the one or more FMDVs.

20 Claims, 7 Drawing Sheets

(56) References Cited

U.S. PATENT DOCUMENTS

| | | | |
|---|---|---|---|
| 7,590,589 B2 * | 9/2009 | Hoffberg | G06Q 20/401 |
| | | | 705/35 |
| 7,757,203 B2 | 7/2010 | Scholl et al. | |
| 7,835,810 B2 | 11/2010 | Mifsud et al. | |
| 7,894,920 B2 | 2/2011 | Mifsud et al. | |
| 8,065,116 B2 | 11/2011 | Sims, Jr. | |
| 8,095,341 B2 | 1/2012 | Sims, Jr. | |
| 8,200,527 B1 * | 6/2012 | Thompson | G06Q 10/0639 |
| | | | 705/7.38 |
| 8,423,325 B2 | 4/2013 | Sims, Jr. | |
| 8,560,286 B2 | 10/2013 | Favier | |
| 2005/0120010 A1 | 6/2005 | Philpott et al. | |
| 2006/0047454 A1 * | 3/2006 | Tamaki | G06Q 10/06 |
| | | | 702/84 |
| 2008/0015720 A1 | 1/2008 | Oyasato et al. | |
| 2008/0120129 A1 * | 5/2008 | Seubert | G06Q 10/06 |
| | | | 705/35 |
| 2008/0154749 A1 | 6/2008 | D'hooghe et al. | |
| 2009/0083333 A1 | 3/2009 | Yamamoto et al. | |
| 2011/0264591 A1 | 10/2011 | Song et al. | |
| 2012/0084061 A1 | 4/2012 | Furumoto et al. | |
| 2012/0166355 A1 * | 6/2012 | Biehler | G06Q 10/067 |
| | | | 705/348 |
| 2014/0143005 A1 | 5/2014 | Jatla | |

FOREIGN PATENT DOCUMENTS

| | | |
|---|---|---|
| CN | 102023859 B | 1/2014 |
| JP | 2004227295 A | 8/2004 |
| KR | 100603870 B1 | 7/2006 |
| KR | 1020100122354 | 11/2010 |
| TW | 200715155 A | 4/2007 |

OTHER PUBLICATIONS

Peng Wei-Ping et al., "Design and Implementation of an Integrated CAD/CAPP System Based on PDM," Wuhan University Journal of Natural Sciences, vol. 7, No. 2, pp. 161-168, Jun. 2002, 8 pages.

Youchon Oh et al. "Mapping product structures between CAD and PDM systems using UML," Computer-Aided Design, vol. 33, No. 7, pp. 521-529, Jun. 2001, 9 pages.

PCT Search Report dated Aug. 31, 2015, for PCT Application No. PCT/US2015/032353, 11 pages.

* cited by examiner

REFINING OF MATERIAL DEFINITIONS FOR DESIGNED PARTS

CROSS-REFERENCE TO RELATED APPLICATION(S)

This application shares some subject matter in common with, but is otherwise unrelated to, U.S. patent application No. 14/298,397 filed on Jun. 6, 2014, titled, "Associating Materials with Bodies in a Computer-Aided Design System", which is hereby incorporated by reference into the present application as if fully set forth herein.

TECHNICAL FIELD

The present disclosure is directed, in general, to computer-aided design, visualization, and manufacturing systems ("CAD/CAM systems"), product lifecycle management ("PLM") systems, and similar systems, that manage data for products and other items (collectively, "Product Data Management" systems or PDM systems).

BACKGROUND OF THE DISCLOSURE

Material definitions are useful for tracking and assigning to designed parts in a data system. Improved systems for capturing material definitions are desirable.

SUMMARY OF THE DISCLOSURE

Various disclosed embodiments include a method for assigning and refining material definition to a designed part, the method performed by a data processing system and including accessing the designed part. The method also includes assigning one or more nominal material definitions (NMDs) of one or more materials to the designed part. The method further includes selecting one or more functional material definition variations (FMDVs) associated with the assigned NMD for the designed part in order to generate a refined material definition (RMD) for the designed part. The method includes generating the refined material definition (RMD) based on the NMD and the one or more FMDVs.

Various disclosed embodiments also include a data processing system including a processor. The data processing system also includes an accessible memory. The data processing system is configured to access a designed part. The data processing system is also configured to assign one or more nominal material definitions (NMDs) of one or more materials to the designed part. The data processing system is further configured to select one or more functional material definition variations (FMDVs) associated with the assigned NMD for the designed part in order to generate a refined material definition (RMD) for the designed part. The data processing system is configured to generate the refined material definition (RMD) based on the NMD and the one or more FMDVs.

Various disclosed embodiments further include a non-transitory computer-readable medium encoded with executable instructions that, when executed, cause one or more data processing systems to access a designed part. The non-transitory computer-readable medium encoded with executable instructions that, when executed, also cause the one or more data processing systems to assign one or more nominal material definitions (NMDs) of one or more materials to the designed part. The non-transitory computer-readable medium encoded with executable instructions that, when executed, further cause the one or more data processing systems to select one or more functional material definition variations (FMDVs) associated with the assigned NMD for the designed part in order to generate a refined material definition (RMD) for the designed part. The non-transitory computer-readable medium encoded with executable instructions that, when executed, cause the one or more data processing systems to generate the refined material definition (RMD) based on the NMD and the one or more FMDVs.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Figure 1:
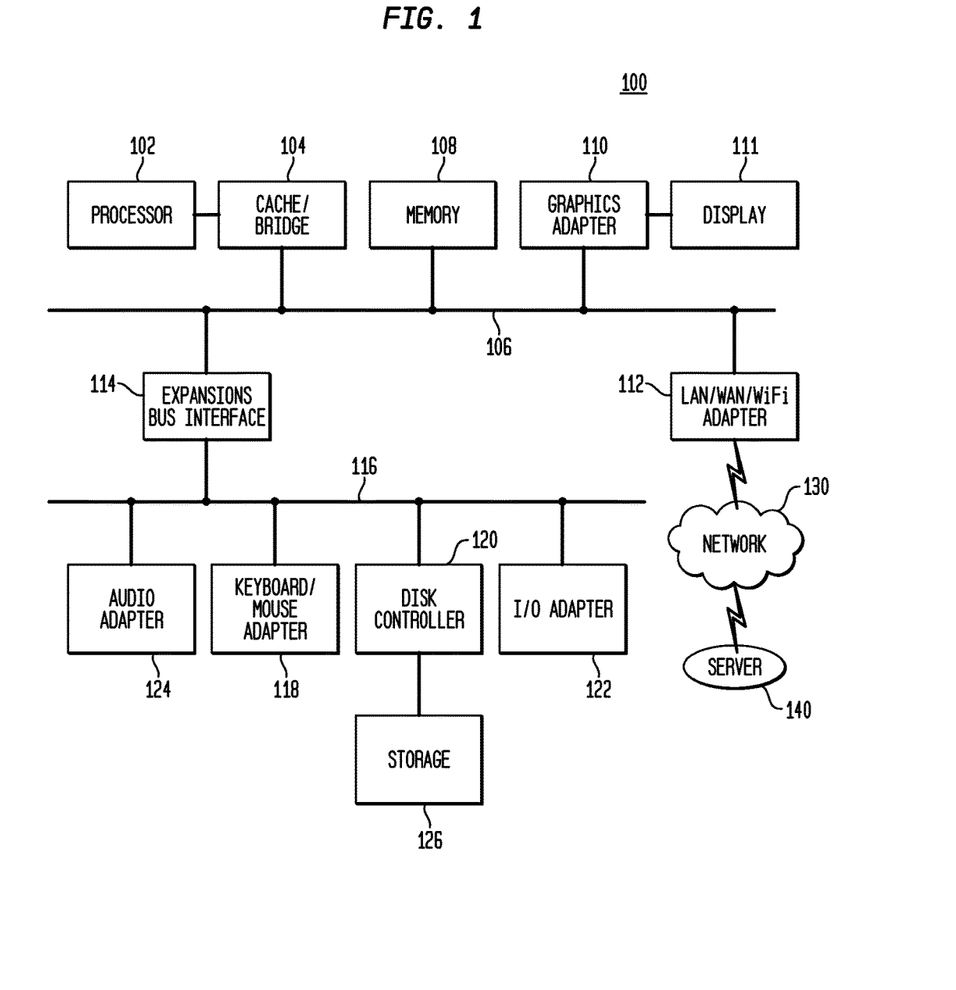
FIG. 1 illustrates a block diagram of a data processing system in which an embodiment can be implemented.

FIG. 1 illustrates a block diagram of a data processing system in which an embodiment can be implemented, for example as a CAD or PDM system particularly configured by software or otherwise to perform the processes as described herein, and in particular as each one of a plurality of interconnected and communicating systems as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. Wi-Fi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, track pointer, touchscreen, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

The proliferation of material definitions and a lack of robust systems for tracking material definition variations in product design and development can create lost man hours as well as generate unnecessary errors.

Figure 2A:
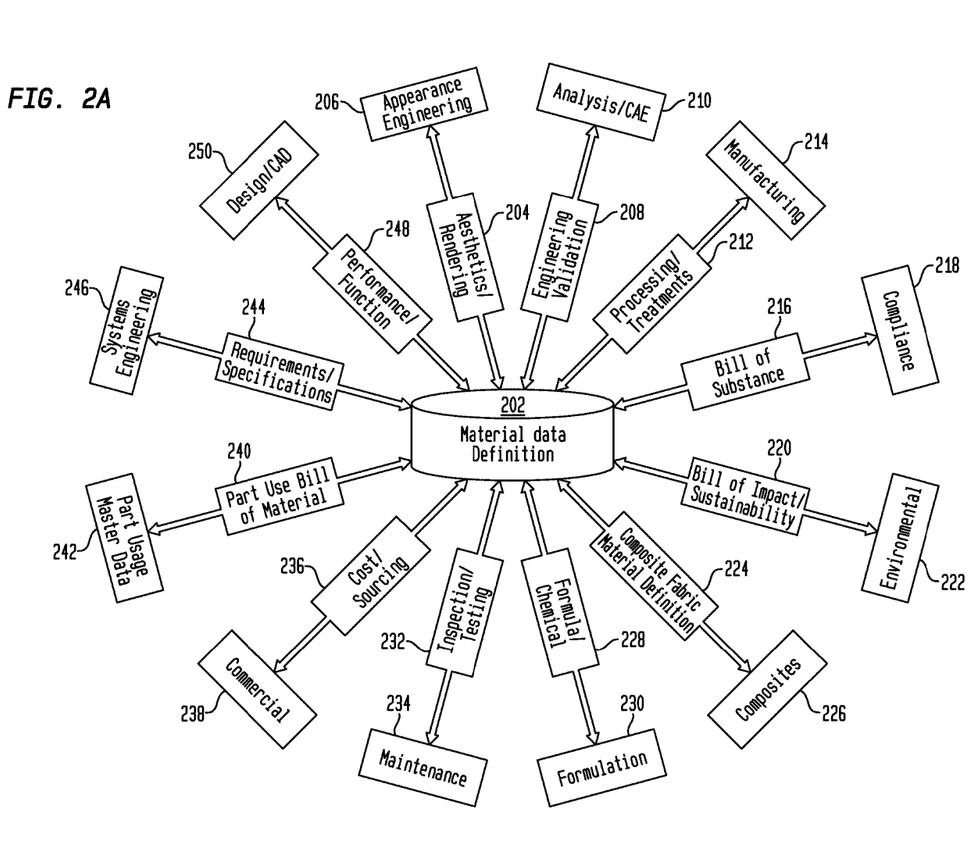
FIG. 2A illustrates an example diagram of material data definitions from multiple functional perspectives according to this disclosure.

FIG. 2A illustrates an example diagram of material data definitions from multiple functional perspectives according to this disclosure. As illustrated in FIG. 2A, a plurality of functional perspectives can be associated with a single material data definition 202. Material definitions can be composed of multiple functional material definitions each from the perspective of a product development function. For example, from an appearance engineering prospective 206, aesthetics and rendering functional definition 204 can be associated with the single material data definition 202. From an analysis and computer-aided engineering (CAE) perspective 210, an engineering validation functional definition 208 can be associated with the single material data definition 202. From a manufacturing perspective 214, a process and treatment functional definition 212 can be associated with the single material data definition 202. From a compliance perspective 218, a bill of substance functional definition 216 can be associated with the single material data definition 202. From an environmental perspective 222, a bill of impact and sustainability functional definition 220 can be associated with the single material data definition 202. From a composite perspective 226, a composite fabric material definition 224 used in designs of composite parts can be associated with the single material data definition 202. From a formulation perspective 230, a formula and chemical functional definition 228 can be associated with the single material data definition 202. From a maintenance perspective 234, an inspection and testing functional definition 232 can be associated with the single material data definition 202. From a commercial perspective 238, a cost and sourcing functional definition 236 can be associated with the single material data definition 202. From a part usage and master data perspective 242, a part use bill of materials functional definition 240 can be associated with the single material data definition 202. From a systems engineering perspective 246, a requirements and specification functional definition 244 can be associated with the single material data definition 202. From a design and computer-aid design perspective 250, a performance and functional definition 248 can be associated with the single material data definition 202. As such, each functional perspective can associate a different definition or a different component of material definition for a single material. As illustrated in FIG. 2A, actual material data for the same material specification can vary based on the supplier and production batch, creating difficulty when tracking material data definition variations in designs, parts and products. Furthermore, the lack of robust management of material variations in designs and parts can create difficulty and can cause unnecessary errors when making changes to material assignments and material definitions during a product development lifecycle.

Figure 2B:
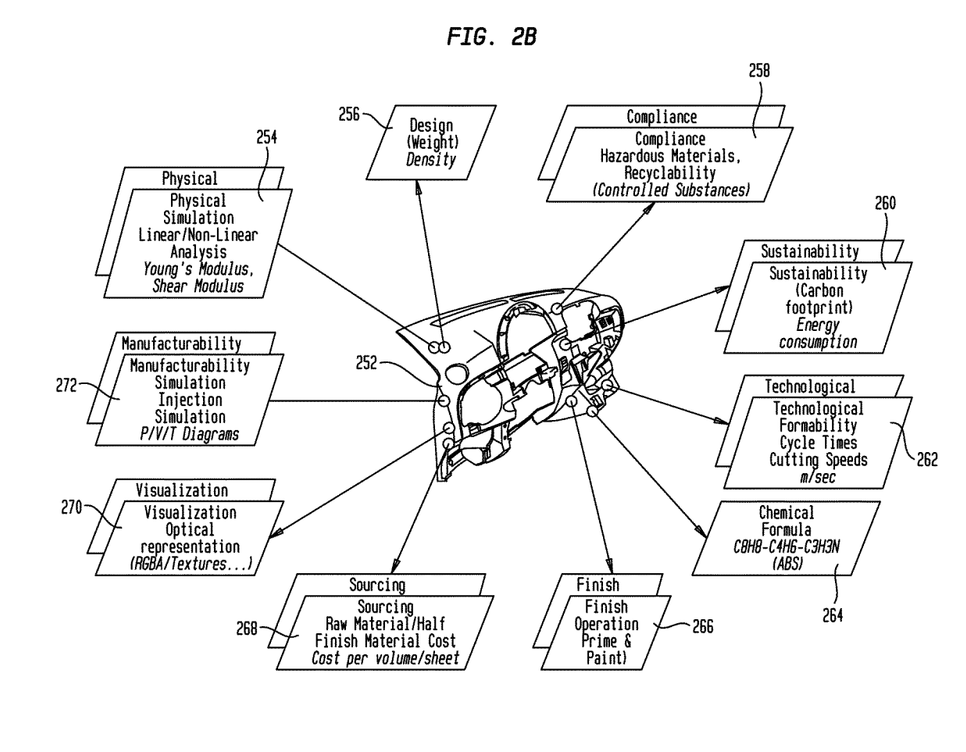
FIG. 2B illustrates an example diagram of material functional data definition variations according to this disclosure.

FIG. 2B illustrates an example diagram of material functional data definition variations according to this disclosure. For example, FIG. 2B illustrates that there can be multiple variations of a functional material definition of an automotive dashboard made of acrylonitrile butadiene styrene (ABS) material, and that different functional data definitions of ABS can have variations. As illustrated in FIG. 2B, a single material of a product 252 can be associated with multiple material functional data definitions and their variations. For example, a product 252 can be associated with one or more physical simulation linear/non-linear analysis, Young's modulus, Shear modulus material functional data definitions 254, one or more design (weight) density material functional data definitions 256, one or more of a compliance hazardous materials, recyclability (controlled substances) material functional data definitions 258, one or more sustainability (carbon foot print) energy consumption material functional data definitions 260, one or more technological formability, cycle times, cutting speeds material functional data definitions 262, one or more chemical formula material functional data definitions 264, one or more finish operations (prime and paint) material functional data definitions 266, one or more sourcing raw material, half finish material cost (cost per volume/sheet) material functional data definitions 268, one or more visualization optical representation material functional data definitions 270, and one or more manufacturability simulation, injection simulation pressure/volume/temperature (P/V/T) diagrams material functional data definitions 272. As such, depending on the contextual intended use of a particular product 252, one or more material definitions can be refined for that particular product 252.

As disclosed herein, systems and methods for tracking associations between nominal material definitions (NMDs) and functional material definition variations (FMDVs) can be used to prevent the proliferation of material definitions by combining them to generate a refined material definition (RMD). NMDs can include the chemical and physical uniqueness of a material used with a data processing system. For example, NMDs can be identified by or can include any one or more of an identification number (such as a Chemical Abstract Service (CAS) number), a material grade, a gauge, a treatment, and otherwise. FMDVs can capture definitions of material properties for a specific function (such as a crash or mold flow analysis and their variations). For example, FMDVs can capture variations in functional behavior based on loads, temperatures, and other operating conditions and track these variations without duplicating whole material definitions.

Figure 3:
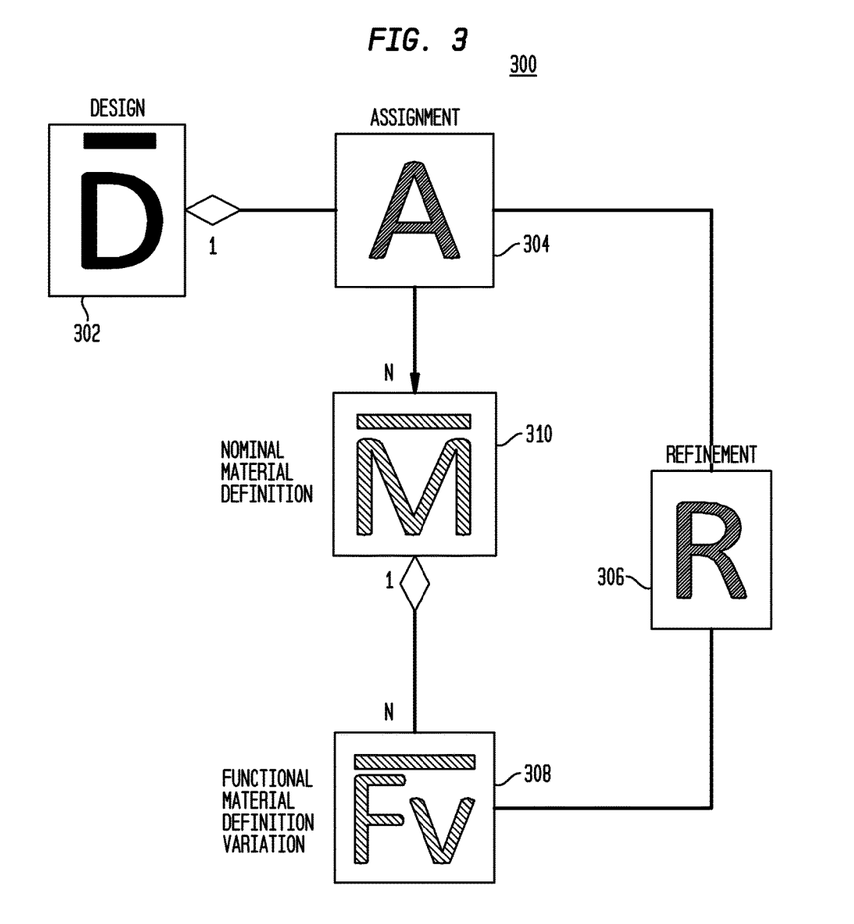
FIG. 3 illustrates an example diagram of manageable relationships between material definitions and functional definitions according to this disclosure.

For data processing systems, material definitions can be an aggregation of data required for modeling of material functional behavior (such as crash, cost, compliance, and otherwise) that is of interest to product design and manufacturing. FIG. 3 illustrates an example diagram 300 of material relationships between material definitions and functional definitions according to this disclosure. As illustrated in FIG. 3, a design 302 can represent a part/product design revision in PDM. Design 302 can reference one or more materials through material assignments. The behavior of the material in the context of a product development function can be captured through the refinement of assignment to nominal definitions by the functional variation. In an embodiment, definition of a specific material used in design 302 can be represented in a data processing system as a composition of an NMD 310 and one or more functional material definition variations FMDVs 308. NMDs 310 can capture nominal material parameter values as specified by industry or proprietary material specification standard. Since material functional models can be context dependent, material definitions and FMDVs 308 can be differentiated allowing FMDVs 308 to be separate objects representing functional variations. NMDs 310 can represent chemically and physically unique material in PDM. As previously stated, NMDs 310 can be identified by a combination of a name, a material identification number (such as a CAS number), a grade, a gauge, a treatment, and otherwise. NMDs 310 can hold references to multiple FMDVs 308.

FMDVs 308 can capture definitions of material properties for a specific function such as a crash or mold flow analysis and their variations. Functional behavior of a material can vary based on the loads, temperatures, and other operating conditions. FMDVs 308 can capture and track these variations without duplicating whole material definitions.

Assignment or material assignment 304 can capture the fundamental relation between geometry and a material and can provide a basis for precise tracking in order to calculate mass, moment of inertia and make other mathematical calculations. Furthermore, assignment 304 can also be used for material data driven validation of a product design. Refinement or RMD 306 can provide the ability to refine a material definition or change a material assignment to deal with different, unique, or specific material functional variations. For example, refinement 306 can capture the usage of a specific material functional variation in the context of a given design. By providing a combination of FMDVs 308 and an NMD 310 to a specific part assigned with a particular material, a data processing system can robustly manage the material data in product development lifecycle with an RMD 306.

Figure 4A:
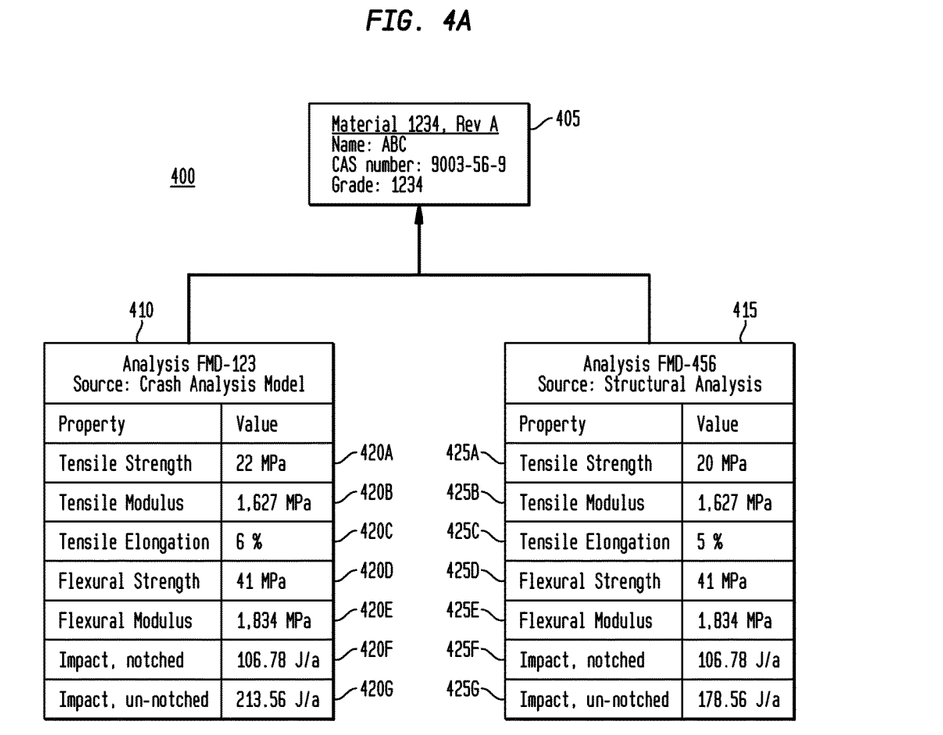
FIG. 4A illustrates an example diagram of a relationship between nominal material definitions (NMDs) and functional material definition variations (FMDVs) according to this disclosure.

FIG. 4A illustrates an example diagram 400 of a relationship between NMDs and FMDVs according to this disclosure. An NMD can contain one or more attributes. For example, as illustrated in FIG. 4A, an NMD 405, such as Material 1234, Rev A can include a name (such as ABS), a material identification number (such as CAS number), and a grade.

Furthermore, an NMD 405 can be associated with one or more FMDVs 410 or 415. For example, an NMD 405 (such as NMD: Material 1234, Rev A) can be associated with one or more FMDVs 410 or 415 (such as FMDV: AnalysisFMD-123 Source Crash Analysis Model and FMDV: AnalysisFMD-456 Source Structural Analysis). Any one or more of the FMDVs 410 and 415 can be assigned to a part having the NMD 405 (such as NMD: Material 1234, Rev A), for example, based on the contextual intended use of the designed part. Accordingly, the material (ABS) definition for crash analysis of a designed part that may experience a crash during the operation is a combination of NMD 405 and FMDV 410 (such as FMDVs: AnalysisFMD-123 Source Crash Analysis Model). For the same material (ABS) definition for structural analysis of a designed part that needs to maintain static structural integrity during operation is a combination of NMD 405 and 415 (such as AnalysisFMD-456 Source Structural Analysis).

Additionally, FMDVs 410 and 415 can be associated with different parameter values 420A-420G and 425A-425G based on the specific FMDV. For example, with a first FMDV 410 (such as FMDV: AnalysisFMD-123 Source Crash Analysis Model), the parameter value 420A (such as the tensile strength value of the material associated with the NMD 405) can be 22 MPa, while with a second FMDV 415 (such as FMDV: AnalysisFMD-456 Source Structural Analysis), the parameter value 425A (such as tensile strength value of the material associated with the NMD 405) can be 20 MPa. By providing data unique to different FMDVs 410 and 415, operators using the data processing system can continuously evaluate the suitability of the selected material in light of the context of the intended use of the designed part.

Figure 4B:
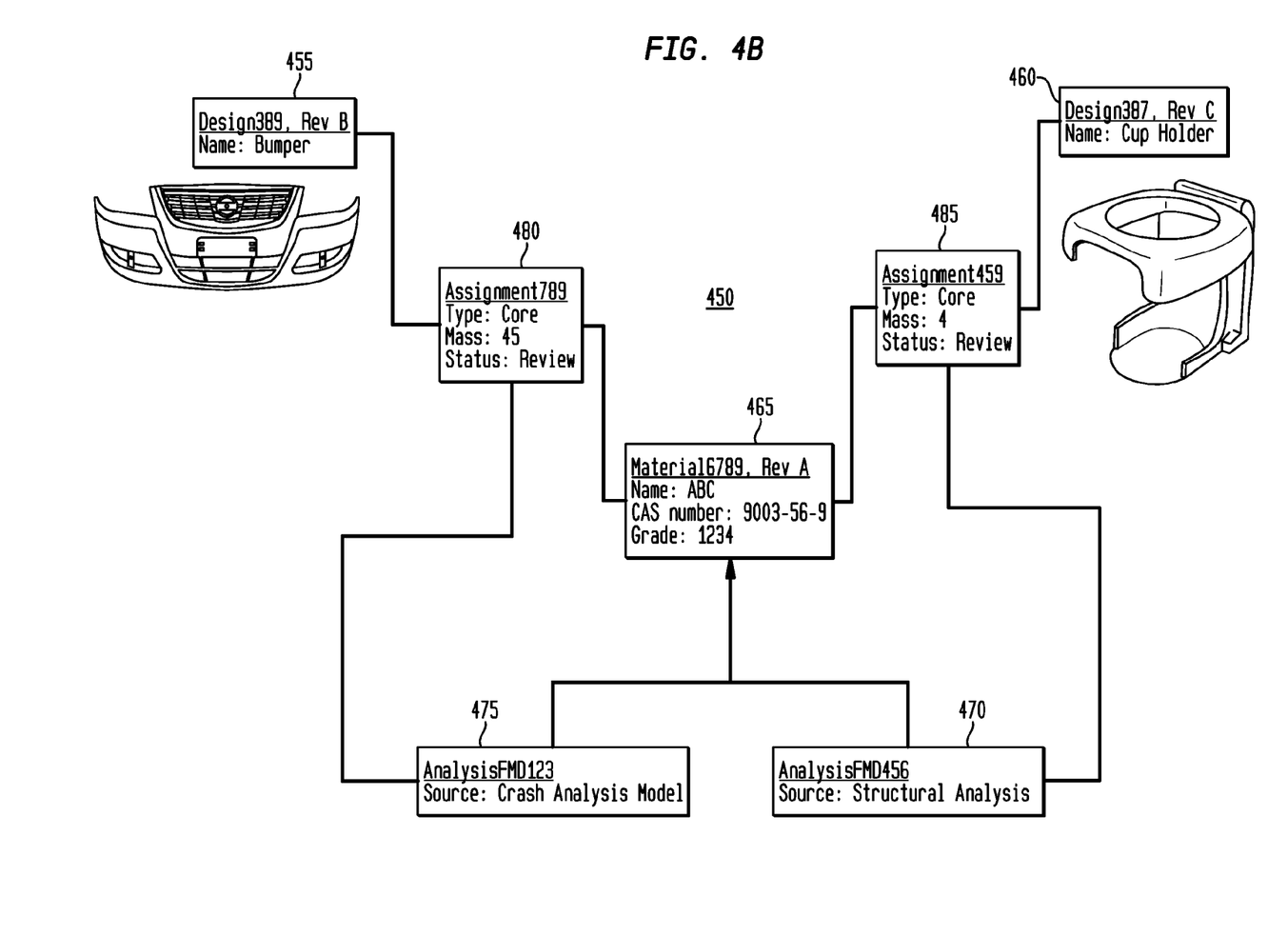
FIG. 4B illustrates a specific example diagram of context based assignment and refinement using FMDVs with different designed parts according to this disclosure.

FIG. 4B illustrates a specific example diagram 450 of context based assignment and refinement using FMDVs with different designed parts according to this disclosure. As illustrated in FIG. 4B, two different designed parts 455 and 460 (such as the fender and the cup holder) can be assigned NMD 465 (such as the NMD: Material6789, Rev A). After the initial assignment of an NMD 465 (such as NMD: Material6789, Rev A) to both design parts 455 and 460, a data processing system 100 can refine the assignment.

For example, the data processing system 100 can determine the material definitions required for different designs for the same material (ABS) based on the context. For example, an NMD 465 (such as NMD: Material6789, Rev A) is associated with at least two FMDVs 470 and 475 (such as FMDV: AnalysisFMD-123 Source for Crash Analysis Model and FMDV: AnalysisFMD-456 Source for Structural Analysis). The data processing system 100 can associate a first designed part 455 with a first FMDV 475 (such as FMDV: AnalysisFMD-123 Source for Crash Analysis) because the first designed part 455 (in this case the fender) may be likely to experience a collision or crash during operation or use, hence the context is crash analysis.

Furthermore, the data processing system 100 can also associate a second designed part 460 (such as the cup holder) with the second FMDV 470 (such as FMDV: AnalysisFMD-456 Source for Structural Analysis) because the second designed part 460 may be likely to provide structural support for another object (such as a cup) during operation or use. The data processing system 100 can also determine not to associate the second designed part 460 with the first FMDV 475 (such as FMDV: AnalysisFMD-123 Source Crash Analysis Model) because the second designed part 460 may not be likely to experience a collision or crash during operation or use, hence the context is static structural analysis.

Accordingly, a data processing system 100 can assign an NMD 465 to a designed part and subsequently assign one or more FMDVs 470 and 475 to the designed part based on its contextual intended use or operation providing a robust tracking system of materials and without proliferating material definitions. The assignment can combine the NMD 465 with one or more FMDVs 470 and 475 to generate an RMD 480 and 485 providing a specific material definition for each designed part 455 and 460.

Furthermore, it should be understood that while this disclosure provides specific examples of materials associated with NMDs 465, these specific examples do not place a limit on the types of materials that can be associated with NMDs 465. Additionally, it should be understood that while this disclosure provides specific examples of FMDVs associated with NMDs, these specific examples do not place a limit on the types of FMDVs that can be associated with a particular NMD. For example, FMDVs can provide parameters related to high altitude conditions, high pressure conditions, high temperature conditions, low temperature conditions, high humidity conditions, low humidity conditions, high radiation conditions, and the like.

Figure 5:
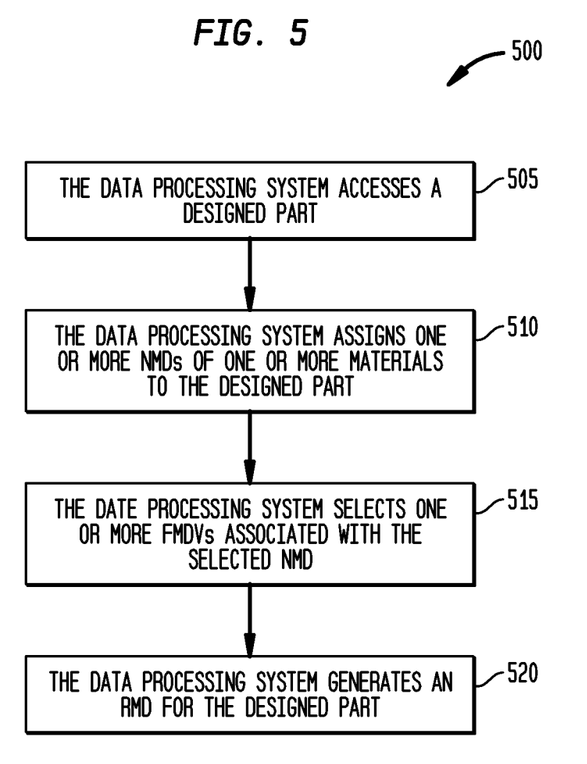
FIG. 5 illustrates a flowchart of a process in accordance with disclosed embodiments that may be performed, for example, by a data processing system in order to generate refined material definitions (RMDs) for designed parts.

FIG. 5 illustrates a flowchart of a process 500 in accordance with disclosed embodiments that may be performed, for example, by a data processing system in order to generate RMDs for designed parts. At step 505, a file depicting a designed part can be accessed by a data processing system. For example, a data processing system can open or access a file (such as a CAD file) illustrating a designed part of bicycle frame in a storage (such as storage 126). Access or accessing, as used herein, can include loading from storage, receiving or accessing from another device or process, receiving or accessing via an interaction with a user, or otherwise.

At step 510, one or more NMDs of one or more materials can be assigned to the designed part by the data processing system 100. For example, the data processing system 100 can select or assign an appropriate NMD, in this example an NMD associated with aluminum, for the bicycle frame. In an embodiment, the data processing system 100 can be an automated system which can, for example, recognize (via look-up table or by geometric configuration, for example) particular designed parts and automatically assign an NMD to a designed part. Conversely, the data processing system 100 can receive a user input in order to select or assign the appropriate NMD to the designed part.

At step 515, the data processing system 100 can select or assign one or more FMDVs associated with the selected NMD to generate an RMD for the designed part. The data processing system 100 can assign an FMDV to a designed part based on the contextual intended use of the designed part. For example, after selecting an NMD associated with aluminum, the data processing system 100 can further examine the bicycle frame and determine that this particular bicycle frame is intended for a dirt bike and thus may experience rough collisions. Subsequently, the data processing system 100 can identify an FMDV (such as FMDV: AnalysisFMD-123 Source Crash Analysis Model) that is associated with the selected NMD and select or assign the FMDV (such as FMDV: AnalysisFMD-123 Source Crash Analysis Model) to generate an RMD for the bicycle frame.

At step 520, the data processing system can generate an RMD based on the NMD and the one or more FMDVs for the designed part. The data processing system can then store the RMD.

In an embodiment the data processing system 100 can use the RMD in order to track (or search) one or more designed parts (such as in the CAD file) and track (or search) for one or more RMDs based on a designed part.

For example, stainless steel can be associated with an RMD which has been assigned to one or more designed parts. One or more FMDVs may have also been selected and combined with the NMD in order to generate the RMD for the one or more designed parts. The data processing system can track or search the one or more designed parts based on the RMD (such as one or more designed part's assigned NMD or one or more FMDVs assigned to the one or more designed part's NMDs). Thus, based on a material used for a designed part or based on an indication of a material and a function or contextual intended use for the designed part, the data processing system can track or search a designed part. For example, if a designer or a manufacturer wishes to look up or view one or more designed parts which use a particular material or which use a material for a particular purpose, the designer can use the data processing system 100 to track or search the designed parts based on an RMD. In an embodiment, the data processing system 100 can use an NMD and one or more FMDVs associated with the NMD (which is used to generated the RMD) to identify one or more different designed parts with the same RMD.

In an embodiment, after the data processing system 100 tracks the one or more designed parts, the data processing system 100 can provide a reference to (such as a specific parameter value of an FMDV via display), provide a verification of (such as through a display) an RMD generated for the one or more designed parts, and can change the RMD (such as by changing one or more FMDVs assigned to an NMD assigned to the one or more designed parts) of the one or more designed parts. For example, a data processing system 100 can determine that a material change to one or more designed parts has been made. The data processing system 100 can track a designed part based on a first RMD assigned to the designed part. The data processing system 100 can change the first RMD to a second RMD for example, by changing an NMD or one or more FMDVs.

In another example, one or more designed parts may have been assigned an NMD associated with a particular material. One or more FMDVs may have also been selected to generate an RMD for the first designed part. The data processing system 100 can track or search the generated RMD based on (for example by receiving an input of a name, model number, or the like) the one or more designed parts. Thus, the data processing system 100 can use a name or model number of one or more designed parts in order to track or search RMDs and specifically NMD and parameters related to the one or more designed parts' contextual intended functions. As such, if a designer or a manufacturer wishes to look up or view one or more materials and specifically how those one or material withstand particular conditions, the data processing system 100 can track or search an RMD based on one or more designed parts. Furthermore, if a designer wishes to look up or view an RMD, the designer can use the data processing system 100 to identify one or more different designed parts with the same RMD.

In an embodiment, after the data processing system 100 tracks an RMD, the data processing system 100 can provide a reference to, or provide a verification of, or change an RMD assigned to the one or more designed parts. For example, a designer may have decided that another material is better suited for a particular set of one or more designed parts than the material originally assigned to the one or more designed parts. The data processing system 100 can track an RMD assigned to the set of one or more designed parts and change the RMD for a designed part of the set of one or more designed parts to a different RMD. In an embodiment, the data processing system 100 can add or delete one or more FMDV for the RMD or a different NMD assigned to the one or more designed parts in order to change the RMD of the set of one or more designed parts.

Of course, those of skill in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke 35 USC §112(f) unless the exact words "means for" are followed by a participle.

What is claimed is:

1. A method of assigning a refined material definition (RMD) to a designed part, the method performed by a data processing system and comprising:
   accessing the designed part;
   assigning one or more nominal material definitions (NMDs) of one or more materials to the designed part;
   selecting one or more functional material definition variations (FMDVs) associated with the assigned NMD for the designed part in order to generate the RMD for the designed part; and
   generating the RMD based on the NMD and the one or more FMDVs.

2. The method of claim 1, further comprising tracking one or more designed parts based on the RMD and tracking the RMD based on the designed part and product development process context.

3. The method of claim 2, further comprising after tracking the one or more designed parts based on the RMD or after tracking of the RMD based on the designed part, changing the RMD generated for the designed part.

4. The method of claim 3, wherein changing the RMD comprises adding one or more FMDVs assigned to the NMD and deleting the one or more FMDVs assigned to the NMD.

5. The method of claim 1, wherein each of the one or more FMDVs comprises one or more parameter values associated with a contextual intended function of the designed part.

6. The method of claim 1, wherein the one or more NMDs comprise one or more of an identification number, a material grade, a gauge, and a treatment.

7. The method of claim 1, wherein the one or more FMDVs are associated with a contextual intended function of the designed part.

8. A data processing system comprising:
a processor; and
an accessible memory, the data processing system particularly configured to:

access a designed part;

assign one or more nominal material definitions (NMDs) of one or more materials to the designed part;

select one or more functional material definition variations (FMDVs) associated with the assigned NMD for the designed part in order to generate a refined material definition (RMD) for the designed part; and generate the RMD based on the NMD and the one or more FMDVs.

9. The data processing system of claim 8, wherein the data processing system is configured to track one or more designed parts based on the RMD and track the RMD based on the designed part.

10. The data processing system of claim 9, wherein the data processing system is configured to change the RMD generated for the designed part after tracking the designed part based on the RMD or after tracking the RMD based on the designed part.

11. The data processing system of claim 10, wherein the data processing system is configured to change the RMD generated for the designed part after tracking the one or more designed part based on the RMD or after tracking of the RMD based on the designed part.

12. The data processing system of claim 8, wherein each of the one or more FMDVs comprises one or more parameter values associated with a contextual intended function of the designed part.

13. The data processing system of claim 8, wherein the one or more NMDs comprise one or more of an identification number, a material grade, a gauge, and a treatment.

14. The data processing system of claim 8, wherein the one or more FMDVs are associated with a contextual intended function of the designed part.

15. A non-transitory computer-readable medium encoded with executable instructions that, when executed, cause one or more data processing systems to:

access a designed part;

assign one or more nominal material definitions (NMDs) of one or more materials to the designed part;

select one or more functional material definition variations (FMDVs) associated with the assigned NMD for the designed part in order to generate a refined material definition (RMD) for the designed part; and generate the RMD based on the NMD and the one or more FMDVs.

16. The computer-readable medium of claim 15, wherein the data processing system is configured to track one or more designed parts based on the RMD and track the RMD based on the designed part.

17. The computer-readable medium of claim 16, wherein the data processing system is configured to change the RMD generated for the designed part after tracking the one or more designed parts based on the RMD or after tracking of the RMD based on the designed part.

18. The computer-readable medium of claim 17, wherein the data processing system is configured to change the one or more FMDVs assigned to the NMD assigned to the designed part by adding one or more FMDVs assigned to the NMD and deleting the one or more FMDVs assigned to the NMD.

19. The computer-readable medium of claim 15, wherein each of the one or more FMDVs comprises one or more parameter values associated with a contextual intended function of the designed part.

20. The computer-readable medium of claim 15, wherein the one or more FMDVs are associated with a contextual intended function of the designed part.

* * * * *